Patented Aug. 21, 1945

2,383,123

UNITED STATES PATENT OFFICE 2,383,123

CATALYTIC PROCESS

Manuel H. Gorin, Dallas, Tex., assignor to Socony-Vacuum Oil Company, Incorporated, New York, N. Y., a corporation of New York No Drawing. Application September 24, 1941, Serial No. 412,108

3 Claims. (Cl. 260—683.4)

This invention relates to a process for treating gasolines in order to improve their quality. The invention is concerned particularly with a method of employing catalytic agents for improving the anti-knock value and/or lead susceptibility of gasolines.

Both thermal and catalytic reforming of gasolines to increase their octane value are well-known. Likewise, production of gasolines of high octane value by catalytic isomerization of n-paraffins to isoparaffins; by catalytic alkylation of paraffins with olefins; by catalytic alkylation of aromatic hydrocarbons with olefins; by catalytic polymerization of mono-olefins, etc., are all well established processes in the art. In other words, by each of these processes, hydrocarbon constituents are converted into hydrocarbons of high octane rating. As understood, processes for improving the octane value of gasolines also may be accompanied by improvements in other characteristics, such as, volatility range, reduced gum-forming tendencies, reducing sulfur content, etc. At the present state of the art a great many catalysts have been proposed for the above reactions, and, as a result, the activity, optimum conditions, etc., are known for a large number of catalysts capable of improving the anti-knock value of gasoline.

Heretofore, speed of reaction has been a most important catalyst property from the practical standpoint, because the reaction rate largely controls the size of plant per unit of material put through. In turn, the size of the plant per unit of through-put is usually one of the most important factors in the cost of reforming gasolines and in other catalytic processes. Therefore, the only catalysts which have been commercialized are those capable of giving high reaction rates or yields under feasible conditions. Since most catalysts do not have their optimum activity at ordinary atmospheric conditions, additional expense is incurred to provide optimum catalytic conditions. On the other hand, there are numerous catalysts which have been shown to be operative but not sufficiently active to be attractive for the conventional processes. Again, as indicated above, even the catalysts which are employed commercially may not be particularly active at ordinary atmospheric conditions.

It is an object of my invention to provide a process for catalytically improving the quality of hydrocarbons in gasoline which embodies a novel concept in the manner of employing the catalyst.

Another object is to afford a process for catalytically improving the anti-knock value of gasoline which may be conducted feasibly at ordinary atmospheric conditions.

These and other objects will appear from the following description of my invention.

In accordance with my invention, a suitable catalyst for improving the quality of hydrocarbons in a gasoline is added to a large bulk of gasoline contained in a storage tank where the gasoline remains for a prolonged period of time, the catalyst being added in sufficient amount to effect the desired improvement under prevailing atmospheric conditions within the time allotted for storage.

Since gasoline is normally stored weeks, months, or even years, the activity of the catalyst under the conditions may be quite low as compared to the activity of the catalyst in existing processes which are completed in seconds, minutes, or, at most, hours. Therefore, it will be seen that my process is a step in exactly the opposite direction from that pursued by the workers in this field in their continual endeavor to develop catalysts of ever greater activity.

Accordingly, an important feature resides in the fact that the catalyst chosen, and the conditions under which it is applied, need not be determined primarily by the rate of the reaction or reactions involved. Furthermore, very little or no equipment is required beyond that which is available normally in gasoline or oil refineries.

A still further important and outstanding advantage afforded by my invention results from the very fact that a slow rate of reaction occurs in the process. Thus, I have found that with the slow reaction rate, undesirable side reactions are reduced to a minimum, thereby increasing the value of the process.

The invention is well-suited for the treatment of natural gasoline or straight-run gasoline; however, it is to be understood that any type gasoline may be subjected to the process. Still further, if desired, light olefins, or light iso-paraffins if the gasoline is highly unsaturated, may be added to the gasoline, so that they enter into alkylation condensations with the gasoline hydrocarbons during storage.

Catalysts for the process should be, as indicated above, isomerization, alkylation, polymerization, or reforming catalysts which possess an appreciable activity in small amounts at ordinary temperatures encountered in the storage of gasoline. Further, they preferably, but not necessarily, should be substantially soluble in gasoline so that agitation or contact problems are simplified. Many catalysts are known which fulfill the above requirements, and for this reason, the process is unique in that it allows the utilization of catalysts and processes for improving octane value of gasoline which have not heretofore proved economically feasible as ordinarily conceived.

I prefer to use metallic halide catalysts of the Friedel-Crafts type. A particularly good catalyst is aluminum bromide, used either alone or promoted by halogen acids, water, or other proton-donning substances. Aluminum bromide possesses the desirable trait of being appreciably soluble in gasoline and besides forms little or no sludge of a highly unsaturated nature. Such sludge results in a more rapid destruction of the catalyst, and in a separation of phases which cuts the rate of reaction and requires violent agitation for appreciable reaction to occur. However, under certain circumstances, the appearance of the sludge need not determine the feasibility of the process for it is well known to those versed in the art that the sludge has considerable catalytic activity, and the degree of agitation required may not be excessive.

In practice, amounts of aluminum bromide between about 2 and about 25 per cent by weight have proven effective. It will be understood, however, that the amount of catalyst may vary considerably, depending upon the exact nature of the gasoline being treated, the catalyst activity, the improvement desired, the average temperature and time of storage, etc. By my process, increases in octane number from 5 to 20 units or more can be obtained.

I also have found that when working with certain gasolines they first must be given a "clean-up" treat to remove impurities, and then they may be treated thereafter for improving the quality of the gasoline hydrocarbons. For example, in treating sulfur-containing gasolines, aluminum bromide is first added to remove the undesirable sulfur compounds, and thereafter, the "cleaned-up" gasoline is treated in storage over a prolonged period of time with additional aluminum bromide in order to effect the desired improvements in the hydrocarbons remaining in the gasoline.

The catalyst may be separated from the stored gasoline by appropriate methods suitable to the properties of the catalyst used. Thus, for example, the separation of aluminum bromide from the treated gasoline may be accomplished by distillation or by cooling. In some cases, the residue in the still contains considerable amounts of unused aluminum bromide which may be reused for treating further quantities of gasoline. Eventually, recovery of the bromine may be carried out, for example, by burning the resulting sludge in air in the presence of a suitable catalyst and separating out the bromine formed from the other combustion products. Aluminum bromide is then easily prepared by reacting the liquid bromine with aluminum. By this procedure, the only material expended in substantial amounts will be aluminum.

In order to illustrate clearly the truly remarkable and unexpected improvement in gasoline that may be obtained by my process, there is cited below an example of a specific operation. In this example, 10 mol per cent of aluminum bromide was dissolved in a middle fraction of natural gasoline. The mixture was then allowed to react for three weeks at about 120° F. The outstanding improvement attained is shown by the following data:

| A. S. T. M. | | Untreated gasoline | Treated gasoline |
|---|---|---|---|
| Distillation: | | | |
| Initial | °F | 113 | 92 |
| 10% | °F | 138 | 110 |
| 50% | °F | 156 | 143 |
| 90% | °F | 192 | 290 |
| End point | °F | 216 | 408 |
| Per cent loss | | 2.6 | 3.2 |
| Motor Octane No.: | | | |
| Neat | | 64.1 | 81.3 |
| 1 cc. T. E. L. | | 78.9 | 91.9 |
| 3 cc. T. E. L. | | 84.8 | 98.8 |
| Lead susceptibility | | 2.2 | 2.4 |

Therefore, it will be seen that a very remarkable improvement in octane number is obtained, for example, about 15 to 20 points. The importance of a process which is capable of effecting such an improvement with very little, if any, additional equipment and while the gasoline is lying idle, is obvious.

In the specification and claims, wherein I use the term "prolonged period of time," it is to be understood that I mean a period of time which is at least a matter of weeks, and, therefore, at least two to three weeks.

I claim:

1. The process of catalytically treating gasoline to transform hydrocarbons therein into more desirable hydrocarbons for motor fuel use which comprises admixing a substantial portion of a light isoparaffin with a large bulk supply of the gasoline and dissolving aluminum bromide therein, leaving the aluminum bromide associated with said gasoline isoparaffin mixture for a prolonged period of time while the gasoline is kept is bulk storage at usual atmospheric storage conditions whereby the desired improvement in the gasoline is effected, separating the gasoline boiling hydrocarbons from aluminum bromide remaining in solution, and recovering the gasoline boiling hydrocarbons.

2. The process of claim 1 in which the gasoline boiling hydrocarbons are separated from aluminum bromide in solution by distillation therefrom.

3. The process of claim 1 in which the gasoline boiling hydrocarbons are separated from aluminum bromide in solution by cooling the solution to lower the solubility of aluminum bromide therein whereby the hydrocarbons may be separated from the precipitated aluminum bromide.

MANUEL H. GORIN.